Figure 1:
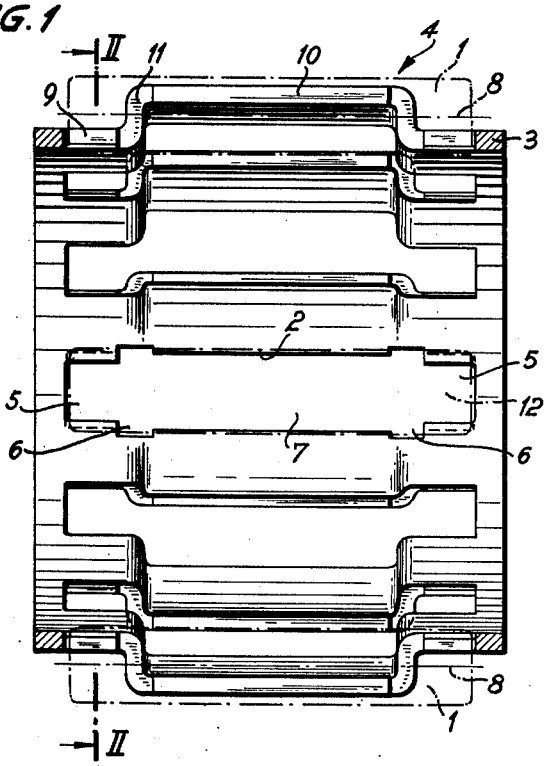

Nov. 12, 1963
G. SCHAEFFLER
3,110,529
CAGE FOR CYLINDRICAL ROLLING ELEMENTS, MORE
PARTICULARLY NEEDLE CAGE
Filed June 21, 1961
6 Sheets-Sheet 1

INVENTOR
George Schaeffler

By

Watson, Cole, Grindle & Watson
Attys.

Nov. 12, 1963 G. SCHAEFFLER 3,110,529
CAGE FOR CYLINDRICAL ROLLING ELEMENTS, MORE
PARTICULARLY NEEDLE CAGE
Filed June 21, 1961 6 Sheets-Sheet 2

INVENTOR
Georg Schaeffler
By
Watson, Cole, Grindle + Watson
Attys.

Nov. 12, 1963    G. SCHAEFFLER    3,110,529
CAGE FOR CYLINDRICAL ROLLING ELEMENTS, MORE
PARTICULARLY NEEDLE CAGE
Filed June 21, 1961    6 Sheets-Sheet 3

INVENTOR
Georg Schaeffler
By
Watson, Cole, Grindle & Watson
Attys.

Nov. 12, 1963  G. SCHAEFFLER  3,110,529
CAGE FOR CYLINDRICAL ROLLING ELEMENTS, MORE
PARTICULARLY NEEDLE CAGE
Filed June 21, 1961  6 Sheets-Sheet 4

INVENTOR
Georg Schaeffler
By
Watson, Cole, Grindle & Watson
Attys.

Nov. 12, 1963  G. SCHAEFFLER  3,110,529
CAGE FOR CYLINDRICAL ROLLING ELEMENTS, MORE
PARTICULARLY NEEDLE CAGE
Filed June 21, 1961  6 Sheets-Sheet 5

INVENTOR
Georg Schaeffler

By

Watson Cole Grindle & Watson
Attys.

Nov. 12, 1963                  G. SCHAEFFLER                   3,110,529
           CAGE FOR CYLINDRICAL ROLLING ELEMENTS, MORE
                     PARTICULARLY NEEDLE CAGE
Filed June 21, 1961                                     6 Sheets-Sheet 6
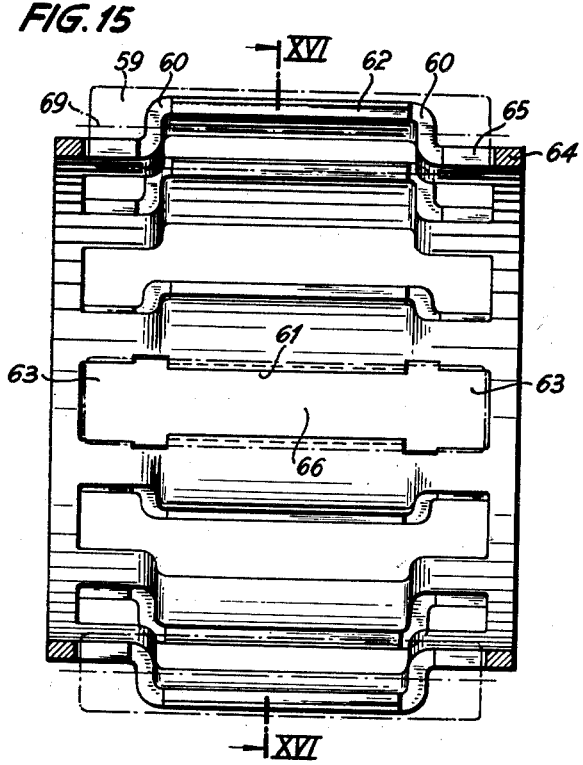
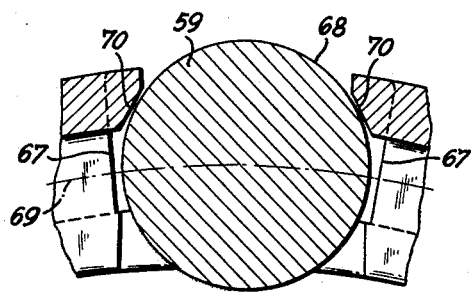
INVENTOR
Georg Schaeffler
By
Watson, Cole, Grindle & Watson
Attys.

United States Patent Office 3,110,529
Patented Nov. 12, 1963

3,110,529
CAGE FOR CYLINDRICAL ROLLING ELEMENTS, MORE PARTICULARLY NEEDLE CAGE
Georg Schaeffler, Herzogenaurach, near Nurnberg, Germany, assignor to Industriewerk Schaeffler o.H.G., Herzogenaurach, near Nurnberg, Germany, a company of Germany
Filed June 21, 1961, Ser. No. 118,659
Claims priority, application Germany June 25, 1960
2 Claims. (Cl. 308—217)

The invention relates to a cage for cylindrical rolling elements, more particularly a needle cage, whose bars bounding the windows hold the rolling elements individually, partly within and partly outside the pitch circle, and wherein the axial bar portions are connected to one another by bent-over portions.

In known cages of this kind, the guiding of the rolling elements which are introduced resiliently into the windows is effected either only along the bent-over portions of the bars or both at the bent-over portions and also at the axially parallel bar portions arranged inside and outside the pitch circle.

In the former case, special shaping of the bar portions which extend obliquely to the cage axis is required both as regards the bar cross-section and with regard to the side surfaces guiding the rolling elements. The cross-section of the bent-over bar portions is made trapezoidal in shape, and the side surfaces of the trapezium have a considerably rounded form which is relatively difficult to calculate and produce if the guiding of the rolling elements is to be effected along a line and not merely by point contact.

The same also applies to known cages of the second kind wherein the guiding of the rolling elements is to be effected at all bar portions at the same time along lines parallel to one another. It is practically impossible for such cages to be produced with the necessary great accuracy and the usual manufacturing tolerances.

Rolling element cages are known which are punched from a flat plate and then, with the formation of oblique connecting portions between the upper and lower axially parallel bar portions, are rolled out and finally bent to the form of the round cage. At punching the upper and lower bar portions are given different widths which necessitate unequal spacings between these bar portions. The dimensions are so calculated that when bending the cage to a circular form the narrower spacing between the bar portions which come to be situated above the pitch circle are broadened whereas the wider spacings between the bar portions which come to be situated below the pitch circle are narrowed, the final result being that in the finished curved cage there is obtained a slot of equal width over the entire cage width. These bar portions are not guides in the sense of the present invention but merely supports for the rolling elements, in order to prevent them from falling out of the cage.

The invention avoids the disadvantages of known cage constructions which are due more particularly to the inaccurate guiding of the rolling elements and the difficult and intricate method of producing the cage.

The invention consists in that the axial parallel guiding of the rolling elements is effected exclusively inside or exclusively outside the pitch circle by bar portions which are axially parallel to one another. These bar portions are extremely simple from the manufacturing technique point of view, and can be produced accurately and with very simple means e.g. by punching. They afford the advantage of absolutely reliable line-contact guiding of the rolling elements and at the same time reliable guiding of the cage.

It is particularly advantageous for the axially parallel guiding of the rolling elements to be effected by the axially parallel bar portions which extend at both sides from each end ring to the adjoining bent-over portion. The resulting guiding of the rolling elements at their ends has the result that the central portion of the rolling elements, which is most subjected to load, does not come into contact with a guiding surface and that accordingly stripping-off or influencing of the lubricating film cannot occur even at very high speeds of rotation. If, for any reason wear phenomena occur in the rolling elements guided at their ends, the ability of the bearing to function is not thereby prejudiced in any way since a reduction of the rolling element diameter at the ends even though only slight leads to reduction of the edge stresses which are often unavoidable in cylindrical rolling elements.

According to a further feature of the invention, the axially parallel bar portions starting from the end rings at both sides, of two adjoining bars, are provided with guide edges or guide surfaces which adjoin the rolling element and effect not only the axially parallel guiding of the rolling elements but at the same time, with appropriate dimensioning of the mutual spacing, taking into account the necessary lubrication film thicknesses between rolling elements and guides, the radial guiding of the cage on the rolling elements.

As a result, a completely accurate co-operation is achieved between cage and rolling elements, each retaining the other, and the cage is not capable of damaging the raceway since it does not have any radial freedom worth mentioning.

The cage is expediently so constructed that the axially disposed bar portions which effect the guiding both of the rolling elements and also of the cage have specially formed-on, e.g. stamped-on, guide surfaces, guide edges or the like which in addition to satisfactory guiding between bar and rolling elements also guarantee the maintenance of accurately determined spacings between the portions of adjoining bars. This construction guarantees perfect dimensional accuracy, since the guide edges or guide surfaces are easily accessible and therefore can be produced or machined in a very simple manner.

According to a further feature of the invention, by means of the forming-on e.g. stamping of the axial bar portions which effect the guiding of both the rolling elements and the cage, guide edges, guide surfaces or the like can be produced in an accurate form determined merely by the rolling element diameter, and dependent on the material thickness of the cage. This guarantees the possibility of providing, independently the thickness of the cage material, guide surface of any desired dimensions which are merely to be dimensioned having regard to the diameter of the rolling elements to be guided. This is particularly important if the use of a relatively thick cage material is necessary, having regard to the fact that the end rings must form the largest possible abutment surface both for the lateral cage abutment and also for the abutment of the rolling elements. Also, this provides a connection between the end rings and the bars which is rigid against distortion.

According to the invention, the cage is also so constructed that the specially formed-on e.g. stamped-on, profiled guide surfaces or the like form together with the rolling elements wedge-shaped openings in which at least in the direction of rotation of the needles before the smallest spacing between rolling element and bar surface the lubricant becomes accumulated and thereby always forms a pressure cushion consisting of lubricant. This construction guarantees an abundant lubrication between guide surface and rolling element and thereby avoids any wear phenomena, guarantees silent running of the cage, and a reduction in the friction between cage and rolling element and thus prevents the development of heat.

It is often necessary more particularly in the case of small rolling elements to use material of slight thickness. For the purpose of stabilisation, more particularly, in a cage of this kind and in order to increase the lateral abutment surfaces for the rolling elements and the cage itself, the bars are conveniently fixed by radially directed end rings which secure the axial position of the rolling elements.

Figure 2:
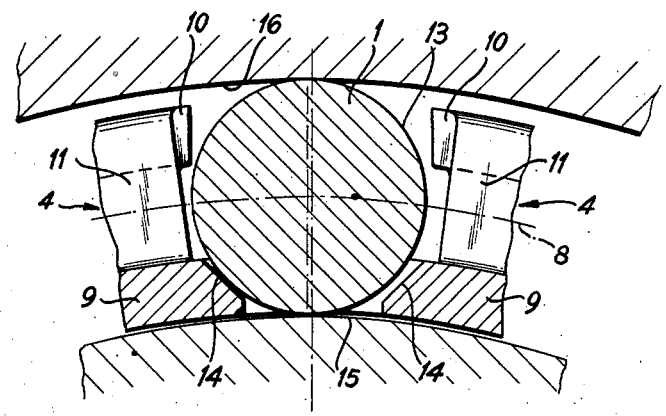
Figure 3:
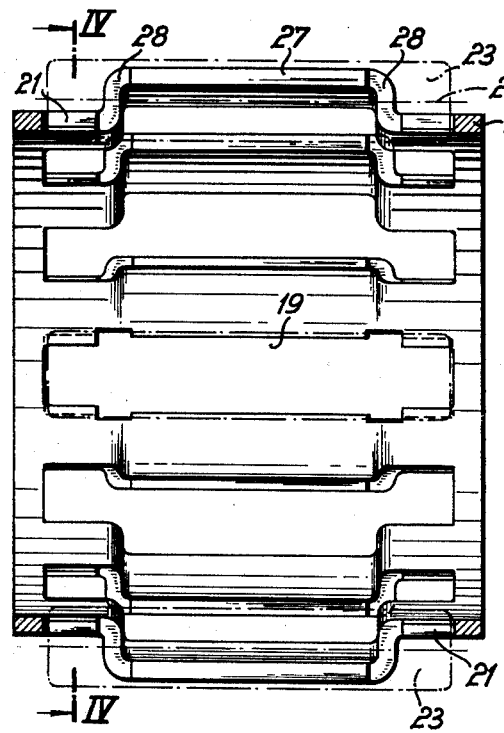
Figure 4:
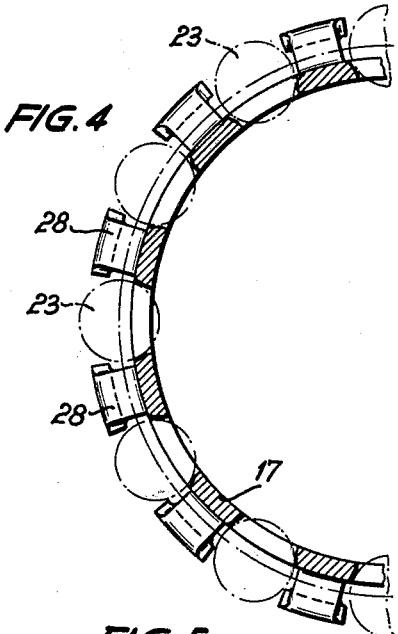
Figure 5:
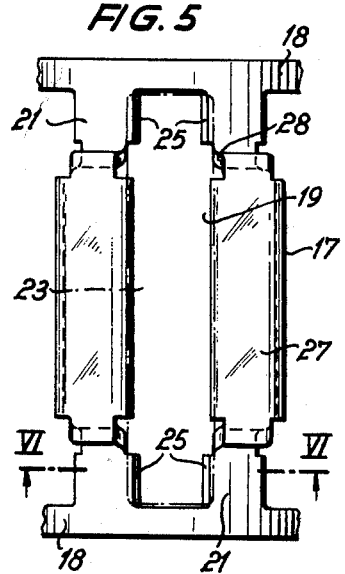
Figure 5A:
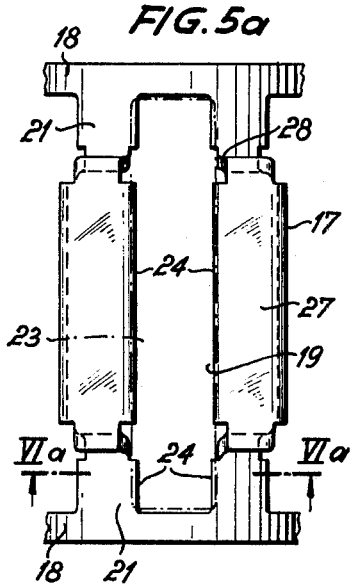
Figure 6:
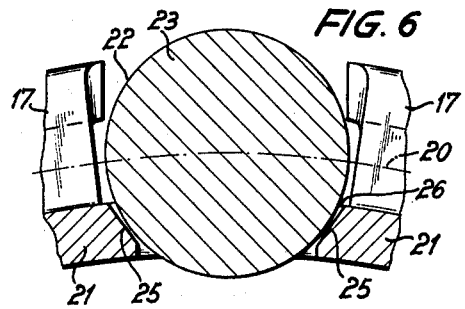
Figure 6A:
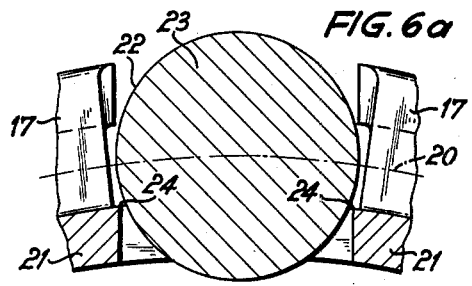
Figure 7:
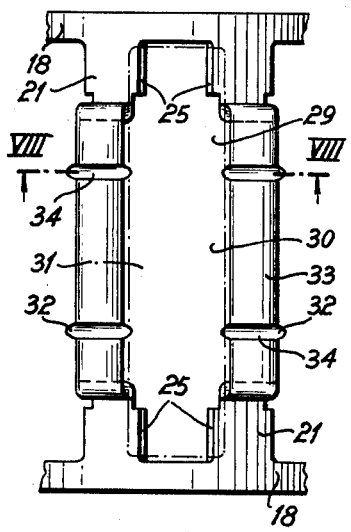
Figure 7A:
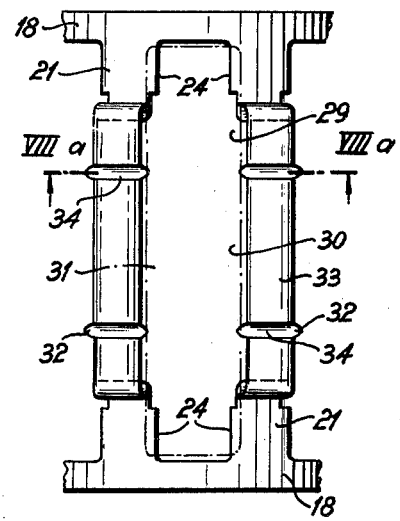
Figure 8:
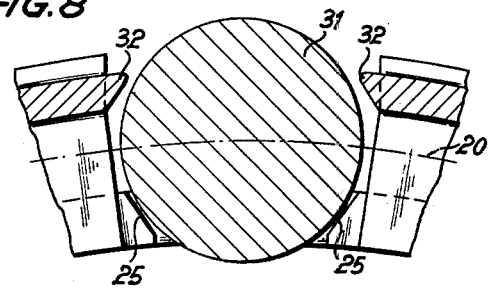
Figure 8A:
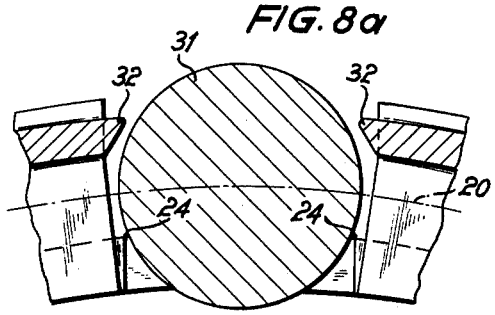
Figure 9:
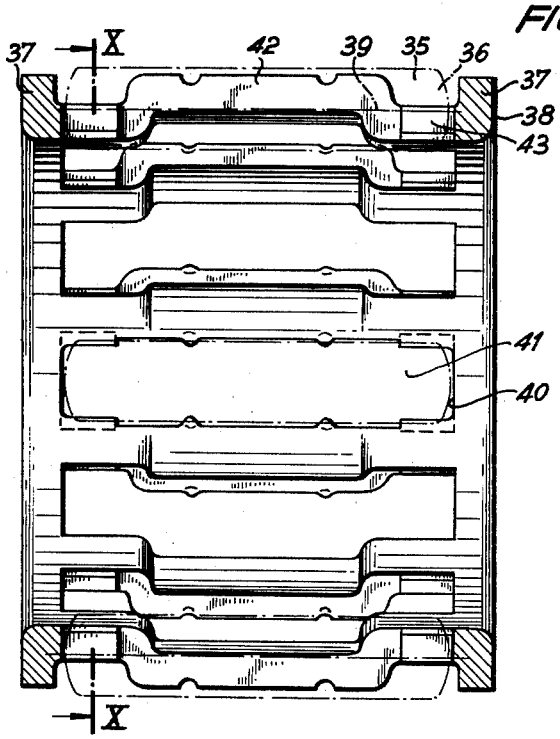
Figure 10:
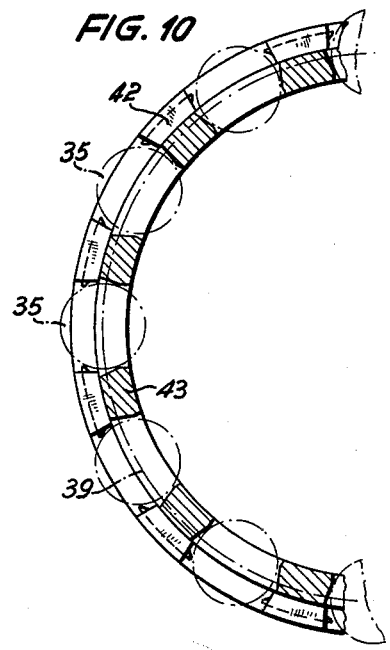
Figure 11:
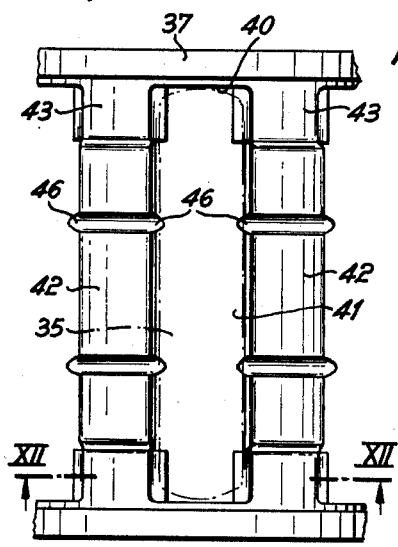
Figure 12:
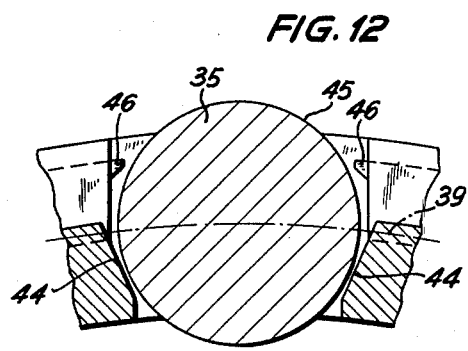
Figure 13:
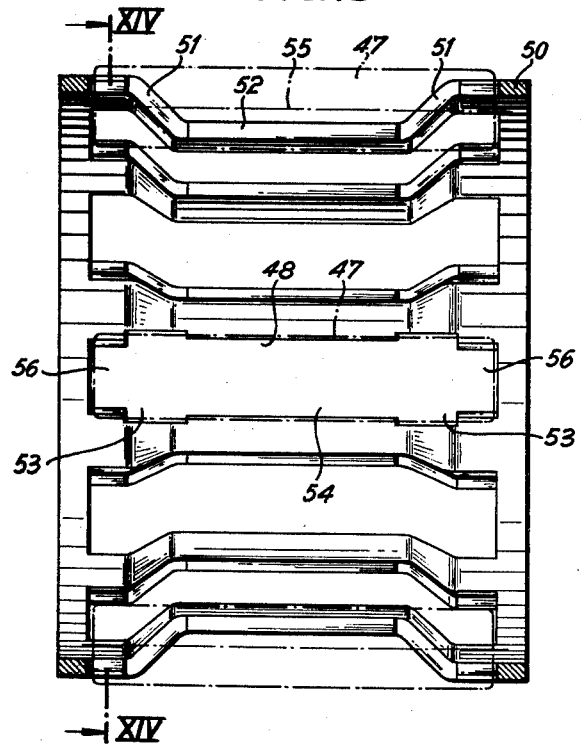
Figure 14:
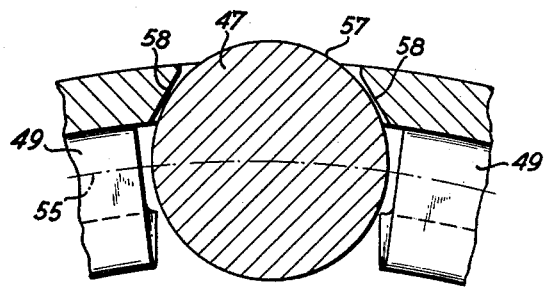

The invention is illustrated by way of example in the drawings wherein:

FIGURE 1 is a longitudinal sectional view through a cage for cylindrical rolling elements on a larger scale, the axially parallel guiding of the rolling elements being effected exclusively inside the pitch circle, FIGURE 2 is a cross-section through a window of this cage taken on the line II—II of FIGURE 1, on a still larger scale, FIGURE 3 is a longitudinal sectional view through a cage for cylindrical rolling elements on an enlarged scale, the rolling elements being guided in axially parallel manner by the cage and at the same time the cage being radially guided on the rolling elements, FIGURE 4 is a partial cross-section of this cage taken on the line II—II of FIGURE 3, FIGURE 5 is a partial elevation of a cage according to FIGURE 3, FIGURE 5a is a partial elevation of a cage according to FIGURE 3, in a slightly modified form, FIGURE 6 is a cross-section through a cage window taken on the line VI—VI of FIGURE 5, on a further enlarged scale, FIGURE 6a is a cross-section through a cage window taken on the line VIa—VIa of FIGURE 5a, FIGURE 7 is a partial elevation of a cage, but with rolled-on external retaining means, FIGURE 7a is a partial elevation of a cage according to FIGURE 7 in a slightly modified form, FIGURE 8 is a cross-section through a cage window according to line VIII—VIII of FIGURE 7 on an enlarged scale, FIGURE 8a is a cross-section through a cage window taken on the line VIIIa—VIIIa of FIGURE 7a on a larger scale, FIGURE 9 is a longitudinal sectional view through a needle cage of modified form and on an enlarged scale, FIGURE 10 is a partial cross-section of the needle cage according to the line X—X of FIGURE 9, FIGURE 11 is a partial elevation of the needle cage according to FIGURE 9, FIGURE 12 is a cross-section through the cage window taken on the line XII—XII of FIGURE 11 on an enlarged scale, FIGURE 13 is a longitudinal sectional view through a cage for cylindrical rolling elements on an enlarged scale, wherein the axially parallel guiding of the rolling elements is effected outside the pitch circle and at the same time the cage is guided radially on the rolling elements, FIGURE 14 is a partial cross-section of this cage taken on the line XIV—XIV of FIGURE 13 on a still larger scale, FIGURE 15 is a longitudinal sectional view through a cage for cylindrical rolling elements on an enlarged scale, wherein the axially parallel guiding of the rolling elements is effected outside the pitch circle between the two bent-over portions, FIGURE 16 is a partial cross-section of this cage taken on the line XVI—XVI of FIGURE 15 on a larger scale.

The cage shown in FIGURES 1 and 2 is produced for example from a cylindrical sleeve or a tubular element having a wall thickness of about ¼ of the rolling element diameter, and any suitable process can be used for producing this starting workpiece i.e. a material-removing process or a process which does not involve cutting. Into this cylindrical sleeve there are punched the windows 2 which are required for receiving the rolling elements 1 and whose length is so dimensioned that the following shaping without removal of material can cause a shortening of the pockets 2 and nevertheless in the final state sufficient axial play can still be available for the rolling elements 1. Lateral end rings 3 hold and fix relatively to one another the bars 4 which remain between the windows 2 over the periphery of the cylinder. The windows 2 are each given a varying width over their length, in such a manner that at both ends 5 they are of smaller width than the rolling element diameter, these portions then being followed by portions 6 which are wider than the rolling element diameter, to be followed again in the central portions 7 by a reduced width. The cylindrical sleeve provided with such windows is then so shaped by a shaping process not involving cutting, in its central regions 6 and 7, that the two portions 6 which are given a greater width than the rolling element diameter are used as offset portions and the central portion 7 comes to be situated outside the pitch circle 8, the cylindrical form being retained. Thus, whereas the narrower portions 5 at the ends of the windows 2 come to be situated within the pitch circle 8 and the likewise relatively narrow portions 7 in the middle of the windows 2 also are situated outside the pitch circle 8, the bar portions 9 and 10 associated with these two portions 5 and 7 are connected by bar portions 11 which are parallel to one another. These bar portions 11 can extend obliquely or radially to the axis of rotation 12 of the cage and do not contact the rolling elements 1 in the pitch circle 8.

Since the portions 5 and 7 of the windows 2 situated inside and outside the pitch circle 8 are narrower than the rolling element diameter, the radial retention of the rolling elements 1, which are introduced resiliently into the windows 2 from the outside, is thus guaranteed.

The spacing of the individual portions 10 and 11 of the bars 4 which are situated in and outside the pitch circle 8 from the generated surface 13 of the rolling elements 1 is greater than the bar portions situated within the pitch circle 8, whereby the rolling elements 1 come to abut only on the guide surface 14 directed tangentially to the rolling element surface 13 and are thus guided. The radial freedom of the cage situated between an inner raceway 15 and an outer raceway 16 is less than the radial freedom of each two inter-associated guide surfaces 14 relatively to the surface 13 of the rolling element 1. As illustrated by way of example, the cage may be guided on the inner raceway 15 or on the outer raceway 16.

FIGURES 3 to 6a show a cage whose bars 17 are held and fixed relatively to one another by lateral end rings 18. Between the bars 17 there are situated the windows 19 which have varying widths over their length. The portions 21 of the bars 17 which extend in the axial direction within the pitch circle 20 can, as shown in FIGURE 6, have an edge 24 which is obtained by punching and is directed towards the generated surface 22 of the rolling elements 23, or, as shown in FIGURE 6a, a guide surface 25 produced by stamping. Each two mutually opposite bar edges 24 or guide surfaces 25 have, taking into account the lubricating film thicknesses required between the guide surfaces and the cage, and the usual play, such a small spacing from the generated surface 22 of the rolling elements 23, that the cage itself is accurately guided in the radial sense on the rolling elements and thus centered thereby. The radial freedom of the cage relatively to the inner or outer race is greater than the radial spacing of each two inter-associated bar edges 24 or guide surfaces 25. The cage is not guided on one of its two raceways or another part.

As FIGURES 7, 7a, and 8, 8a show, the windows 29 of the cage can also be so constructed that in their central portion 30 they are not narrower than the rolling element diameter. The retaining of the rolling elements 31 externally is in this case effected by noses 32 which are formed by upsetting and whose spacing from one another is less than the rolling element diameter. The noses 32 are formed by rolling-over the central cage bars 33, the rolling 34 being either at the bore side or at the outer side.

The cage construction illustrated in FIGURES 9 to 12 is intended particularly for rolling elements 35 having spherical ends 36 and a small diameter. Since a wall thickness of about ¼ of the rolling element diameter is not possible in this case, since such a cage does not have sufficient rigidity and on the other hand there would not be a sufficient abutment surface for the lateral cage abutment and also for the rolling elements, such a cage is manufactured from a cylindrical sleeve whose wall thickness corresponds approximately to half the rolling element diameter. The ends of the sleeve are provided with radially directed rims 37 in order to give the cage an adequately large lateral abutment surface 38. The wall thickness of the cage is so dimensioned that it extends to the pitch circle 39 or beyond, in order that the rolling elements 35 can abut with their centre situated at the pitch circle 39 axially against the end face 40 of the windows 41. The windows 41 which are punched e.g., in the stretched state of the cage, are narrower than the rolling element diameter in the region of the ends of the rolling elements, and are broader in the portions between these end portions. By shaping without cutting, the central bar portions 42 are then pressed outwards, so far that they are slightly smaller at their maximum diameter than the outer raceway. By stamping from the outside, the guide surfaces 44 which are required for guiding the rolling elements at the bar ends 43 are then formed, which again extend conveniently tangentially to the generated surface 45 of the rolling elements. The rolling elements are maintained by noses 46 which are formed by rolling on the central bar portions 42 and whose spacing from one another is less than the rolling element diameter.

FIGURES 13 and 14 show that the cage cross-section can also be the other way round. For accommodating the rolling elements 47, there are punched in a cylindrical sleeve windows 48 between which bars 49 remain over the periphery of the cylinder, these bars being held and fixed in position relatively to one another by lateral end rings 50. The windows 48 here again are given a varying width over their length. By shaping without cutting, the cylindrical sleeve is then formed in its central portions 51 and 52 in such a manner that the portions 53 of the windows 48 which are given a greater width than the rolling element diameter are situated in the offset region and the central portion 54, which is narrower than the rolling element diameter, is situated inside the pitch circle 55. The portions 56 of the windows 48 situated outside the pitch circle at the ends of the rolling elements 47 are also narrower than the rolling element diameter. For guiding the rolling elements on a broad base the necessary guide surfaces 58 extending conveniently tangentially to the generated surface 57 of the rolling elements are arranged outside the pitch circle 55. The radial spacing of each two inter-associated guide surfaces 58 relatively to the generated surface 57 of the rolling elements is less than the clearance of the cage from its two raceways, so that in addition to the guiding of the rolling elements at the guide surfaces, the cage itself is guided and at the same time centered by means of these guide surfaces on the rolling elements.

Since the bar portions 10, 11, 27, 28, 33, 42, 51, 52 situated in the middle of the cages are spaced further from the rolling element generated surface 13, 22, 45, 57 than the portions at the ends of the bars, the film of oil which normally forms when the rolling elements rotate cannot be influenced or stripped off at the central portion of the rolling elements which is subjected to the greatest load.

The guiding of the rolling elements at their ends affords, in the form of embodiment which have been described, the advantages that on the one hand the guiding bar portions are in rigid connection with the lateral end rings and are not detrimentally affected in their position and guiding even at very high rotational speeds by any kind of force influences e.g. by the occurrence of vibrations, and that they do not participate in the resilient insertion of the rolling elements and retain their position constantly. Depending on requirements, they are also capable of being made to an optimum length so that they guide the rolling elements with line contact and in axially parallel manner with absolute reliability at two places far apart from one another.

In the cage according to FIGURES 15 and 16, in contrast to the forms of embodiment hitherto illustrated, the guiding of the rolling elements 59 and also the guiding of the cage on the rolling elements is effected between the two bent-over portions 60. The cage, which again is made from a cylindrical sleeve and is given windows 61 of varying widths, is deformed with its central bar portions 62 as in the form of embodiment shown in FIGURES 1 and 2. But the widths of the individual window portions is made such that the two outer portions 63 only form retaining means for the rolling elements 59 in the inward sense, at the bar portions 65 adjoining the lateral end rings 64, whereas the central portion 66 effects the retaining in the outer sense and at the same time the necessary guiding action. The portions 60 which are bent over and have side surfaces 67 extending parallel to one another connect the bar portions 62 and 65 to one another. The guide surfaces 70 extend outside the pitch circle 69 and tangentially to the rolling element generated surface 68 at the central web portions 62, here again, the illustrated cage cross-section can be reversed, so that the guide surfaces come to be situated within the pitch circle.

As shown for example in FIGURES 6 and 8, it is possible for the bar portions which effect guiding and are situated inside or outside the pitch circle to be made so accurately that axially parallel line-contact guiding of the rolling elements is guaranteed and the cage is guided thereon without any additional processing of the bar edges. In order to provide even finer guiding and to guarantee absolutely reliable dimensional accuracy at the guide surfaces, and to maintain accurately calculated spacings between the guiding bar portions, the bar edges can also be specially formed in all the forms of embodiment. Thus, it is possible, for example, in a simple manner to stamp the axial edges 24 which are formed when the cage is punched so that they become guide surfaces 25.

The guide surfaces 14, 25, 44, 58, 70 are easily accessible from the outside or inside for the introduction of tools, and can easily be worked on since the other bar portions of the cage situated outside or inside the actual guiding portions are spaced further apart from one another than the guiding portions which are to be worked. The formed-on, e.g. stamped guide surfaces extend conveniently tangentially to the generated surface of the rolling element and thus form openings 26 which are wedge-shaped towards the line of contact with the rolling elements and through which the lubricant accumulates at least in the direction of rotation of the rolling elements between the said elements and the guide surfaces, thus forming a pressure cushion for adequate lubrication between guide surface and rolling element. It is also possible for the guide surfaces to be adapted to the circular shape of the generated surface of the rolling element, or to give them, as viewed in cross-section, a larger radius than that of the rolling elements, so that at least in the direction of rotation of the rolling elements the lubricant is accumulated and a pressure cushion is formed in order to guarantee lubrication at a restricted point. The accurate position of the pressure cushion can be determined in all variants, e.g. by small recesses produced by stamping or by retaining sills situated parallel to the rolling elements.

I claim:

1. The combination of a cylindrical bearing cage and rolling elements, said cage comprising a pair of parallel end rings, a plurality of parallel webs interconnecting said end rings and thereby forming a plurality of spaced windows to individually hold the rolling elements partly inside and partly outside a pitch circle and extending parallel to the axis of the cage, bent-over portions connecting said first-mentioned portions which latter being of greater width than the bent-over portions and the axially parallel guiding of the rolling elements being effected exclusively by the web portions arranged on one side of the pitch circle, the parallel web portions which effect the guiding of both the rolling elements and the cage having guide surfaces which project between the web and the rolling element and accurately determine the spacings between the web portions of adjacent webs, said guide surfaces forming wedge-shaped openings together with the rolling elements in the direction of rotation of the rolling elements.

2. The combination according to claim 1, in which said end rings secure the axial position of the rolling elements.

References Cited in the file of this patent

UNITED STATES PATENTS

| | | |
|---|---|---|
| 1,764,198 | Carlson | June 17, 1930 |
| 2,772,128 | Schaeffler et al. | Nov. 27, 1956 |
| 2,848,791 | Neese | Aug. 26, 1958 |

FOREIGN PATENTS

| | | |
|---|---|---|
| 1,023,932 | Germany | Feb. 6, 1958 |